UNITED STATES PATENT OFFICE.

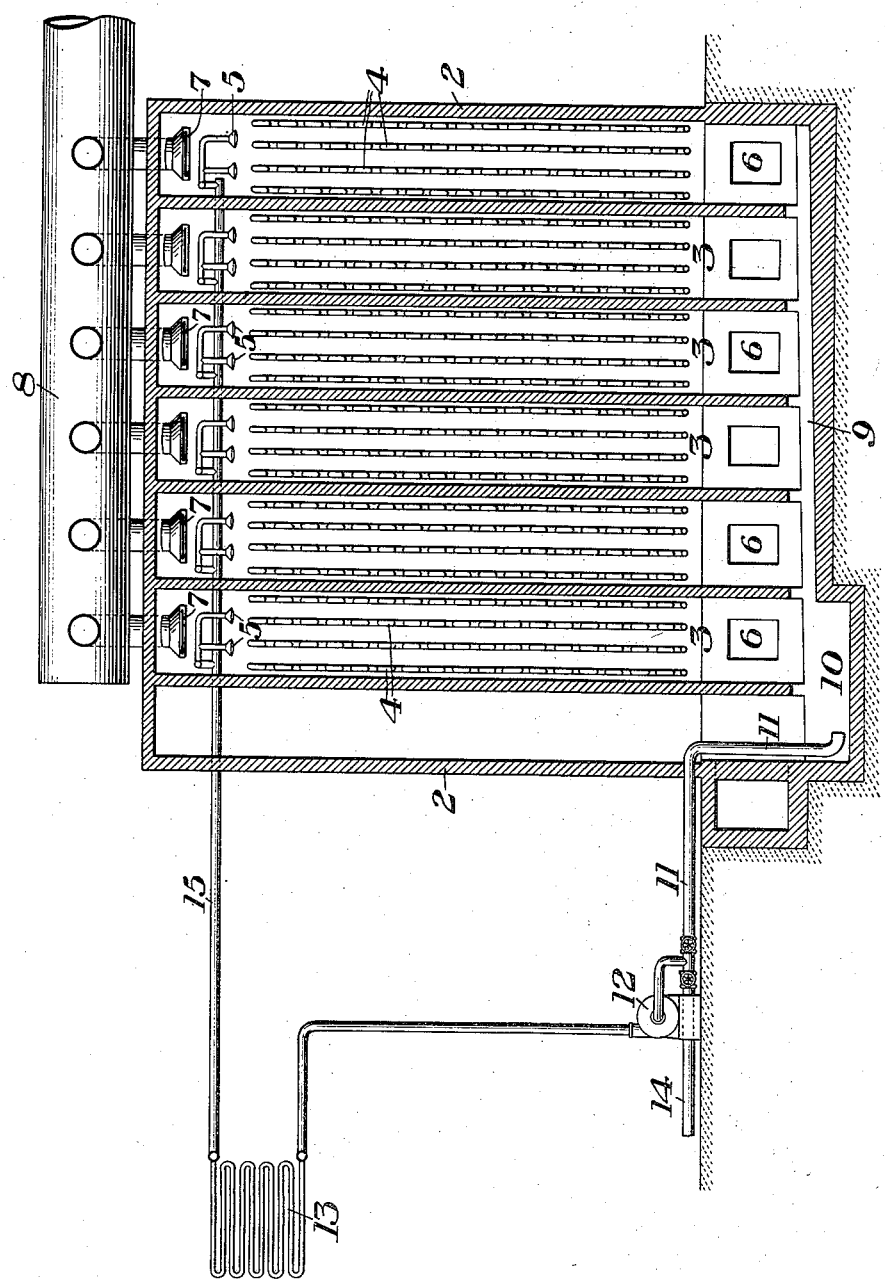

HERMANN A. BRASSERT, OF CHICAGO, ILLINOIS, ASSIGNOR TO JAMES GAYLEY, OF NEW YORK, N. Y.

PROCESS OF DRYING AIR.

958,471.      Specification of Letters Patent.      Patented May 17, 1910.

Application filed December 9, 1908. Serial No. 466,701.

*To all whom it may concern:*

Be it known that I, HERMANN A. BRASSERT, of Chicago, in the county of Cook and State of Illinois, have invented a new and useful Process of Drying Air, of which the following is a full, clear, and exact description, reference being had to the accompanying drawing, in which the figure is a sectional side elevation of apparatus arranged for carrying out my invention.

My invention relates to the drying of air by refrigerators for metallurgical purposes, as in the well known Gayley dry blast system.

The object of the invention is to recover a portion of the heat loss resulting from thawing off the snow or ice from the coils.

The moisture from the air is deposited upon some of the coils in the form of snow or ice, and thus forms an insulating blanket which must be thawed off in order to give proper efficiency. Heretofore this thawing water has been run into the sewers and while reduced to a low temperature by the thawing action, this low temperature water has not been utilized.

My invention consists in utilizing this water or liquid in the ammonia condensers supplying cooling fluid to the pipes for refrigeration. As this water naturally has a very low temperature it is valuable in condensing the ammonia gas. The amount of water extracted from the blast amounts to as much as five thousand gallons in twenty-four hours during seasons when the air contains a large amount of moisture and in addition to this, there is about the same amount of water sprayed on the coils for thawing out the ice. The thawed off snow and ice, together with the spraying water thus being a little above zero degrees C., will greatly aid in lowering the temperature in the ammonia condensers, thus making the refrigerating apparatus more efficient.

In the drawing, I show a building or inclosure 2, containing a series of chambers 3, within each of which is contained the coils or cooling pipes 4. Above the coils in each chamber one or more spraying nozzles 5 are arranged in such manner that the thawed liquid can be evenly distributed by them over the surface of the coils. Preferably, warm water from the ammonia condensers is supplied, though any supply of water at a temperature above freezing can be used.

The sub-chambers may be isolated from each other by means of suitable valves indicated at 6. The air to be dried enters through the valves 6 in the bottom of each sub-chamber and rises around the pipe coils, passing out through the gates 7, into the dry blast pipe 8, on the top of the building, whence it passes to the blowing engine.

After a certain period of operation, snow or ice will collect on the upper coils. A chamber or chambers may then be isolated by shutting the gates at the bottom and the air valve at the top, and the circulation of brine may also be stopped through the coils of this sub-chamber. The thawing water is then turned on through the sprays 5 in this chamber and flows down through the same, melting the ice and collecting in the bottom of the chamber, whence it may be drawn off through a ditch 9, into a basin 10. From this basin the water is drawn through a pipe 11 by a pump 12, which supplies the condensers, indicated at 13, and is usually fed by water entering through pipe 14. The water is thus pumped through the condensing coils and a part of it is used for thawing, being led from these coils to the sprays in the refrigerating building through the pipe 15.

The advantages of my invention result from supplying the thawing water or liquid to the ammonia condensers, thus producing an economy resulting from the low temperature of this thawing water.

Many variations may be made in the form and arrangement of the apparatus, without departing from my invention.

I claim:

1. In the drying of air by refrigeration, the steps consisting of supplying cooling fluid to the cooling pipes of the refrigerating apparatus from a separate ammonia condenser, thawing congealed moisture from the refrigerating pipes by supplying liquid thereto, and then feeding at least a portion of this thawing liquid to the ammonia condenser; substantially as described.

2. In the drying of air by refrigeration, the steps consisting of passing the air over refrigerating pipes, supplying cooling fluid to the pipes from a separate ammonia condenser, intermittently thawing the congealed moisture from the refrigerating pipes by flowing liquid over them, and feeding at least a portion of this thawing liquid to the ammonia condenser; substantially as described.

3. In the drying of air by refrigeration, the steps consisting of passing the air over refrigerating coils, supplying a cooling fluid to the coils from an ammonia condenser, thawing the congealed moisture from the coils by liquid, feeding at least a portion of the thawing liquid to the ammonia condenser, and then withdrawing this water from the condenser and spraying the cooling pipes; substantially as described.

4. In the drying of air by refrigeration, the steps consisting of passing the air over refrigerating pipes in a series of chambers, supplying cooling fluid to the pipes from an ammonia condenser, shutting off the chambers successively, and thawing the congealed moisture from the coils by liquid, and returning at least a portion of the liquid to the ammonia condenser; substantially as described.

5. In the process of drying air by refrigeration, the steps consisting of passing the air over refrigerating coils, thawing the congealed moisture from the coils by the liquid, feeding at least a portion of the liquid to an ammonia condenser forming a part of the refrigerating system, and then withdrawing this water from the condenser and spraying the cooling pipes; substantially as described.

In testimony whereof, I have hereunto set my hand.

HERMANN A. BRASSERT.

Witnesses:
N. O. MORSE,
R. H. BAWLBY.